July 21, 1931.    T. J. SCOFIELD    1,815,165
CONTROL KNOB FOR CONDENSERS
Filed Oct. 30, 1929
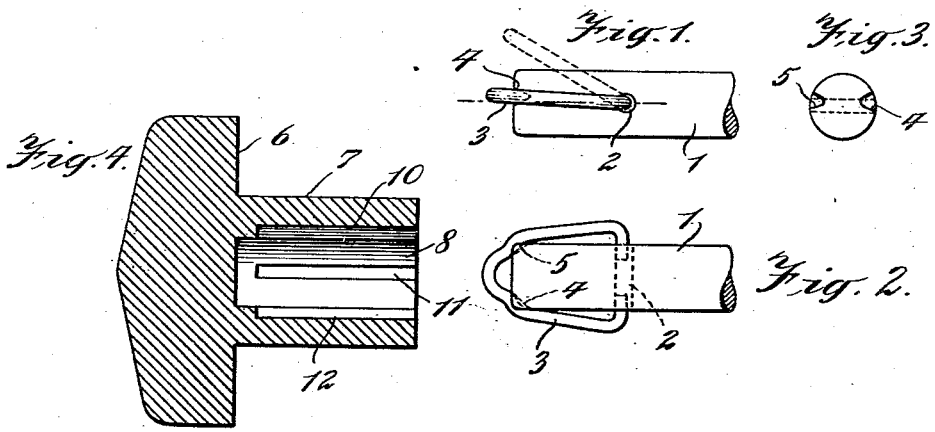
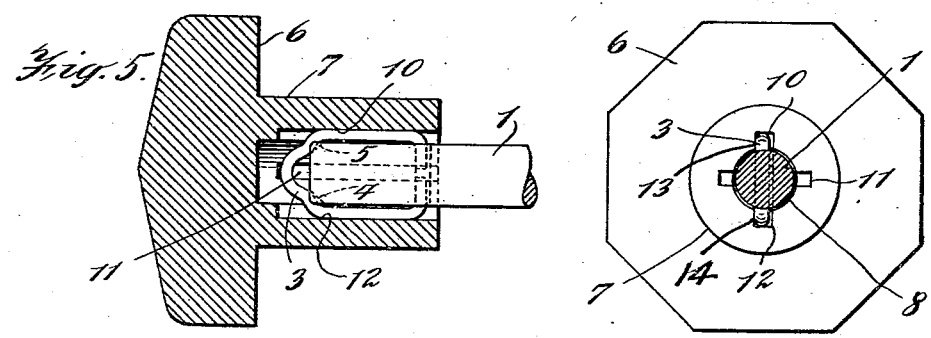
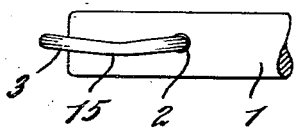
INVENTOR
Theodore J. Scofield
BY
ATTORNEY Patented July 21, 1931

1,815,165

UNITED STATES PATENT OFFICE

THEODORE J. SCOFIELD, OF JACKSON, MICHIGAN, ASSIGNOR TO THE SPARKS-WITHINGTON COMPANY, A CORPORATION OF OHIO

CONTROL KNOB FOR CONDENSERS

Application filed October 30, 1929. Serial No. 403,529.

This invention relates to construction of control knobs for condensers used in radio sets and similar devices.

An object of the invention is to construct a control knob that may be readily applied and removed from the end of a shaft of a condenser or similar device while being gripped sufficiently to normally remain in place.

Another object of the invention is to construct control knobs and attaching means in a cheap and satisfactory manner.

Other objects will appear in the following description, reference being had to the drawings, in which:

Fig. 1 is an elevation of the end of the shaft of a uni-control condenser such as used in radio receiving sets and similar devices.

Fig. 2 is a top view of the end of the shaft shown in Fig. 1.

Fig. 3 is an end view of the shafts shown in Figs. 1 and 2 with the bail or key removed.

Fig. 4 is a section of the control knob in position to be pushed on to the shaft in interlocking relation therewith.

Fig. 5 is a sectional view showing the knob held in position on the shaft by the bail.

Fig. 6 is an end view of the apparatus of Fig. 5.

Fig. 7 is a view of a modification.

The shaft 1 shown in Fig. 1 may be the control shaft of a uni-control gang condenser or of a rheostat inductance control potentiometer or other adjustable arrangement useful in radio receiving sets or other similar devices. The shaft 1 has a hole 2 therein adjacent to the end and fitting in this hole is a wire bail 3 adapted to act as a key. The bail may make a snug fit with the hole 2 or it may be somewhat smaller. The end of the shaft 1 has the periphery notched at 4 and 5 slightly off center as is shown more clearly in Fig. 3. To assemble the bail in position the spring bail 3 is pushed down over the circular rod thus forcing out the ends until they snap into the hole 2, as shown in dotted lines in Fig. 1. The end of the bail is then pushed downward until it snaps into the notches 4 and 5 in the position shown in Fig. 2.

The knob 6 of Fig. 4 may be of any desired shape but I have shown it constructed as is usual in control knobs for present day receiving sets. This knob has an extension 7 which has a central hole 8 with grooves 10, 11, 12 and 13, more clearly shown in Fig. 6. Only two of these grooves, of course, are necessary to fit on to the bail, but for ease in finding the proper position when inserting the knob it is preferable to make more than two of the grooves.

After the bail is in position on the end of the shaft, as shown in Fig. 2, the gang condenser, resistor, inductance, potentiometer, or other device fastened to the end of the rod may be placed in position in the radio set or other device and the end of the rod readily extended through the front panel or side of the device. The knob 6 can then be pushed on to the end of the shaft in the position shown in Fig. 5. It will be seen from this figure that the spring bail has the ends forced downward into the hole 2 and the tension in the spring forces the horizontal portions of the bail against the bottom of grooves 10 and 12. The bail is also forced against the sides of the grooves as shown at 13 and 14 in Fig. 6. There is therefore a double spring tension tending to produce frictional contact between the bail, the rod and the knob. This is sufficient to hold the knob in position yet it permits it to be easily inserted or removed.

In Fig. 7 the eccentric notches have been omitted and contact of the bail with the side and bottom of the slots is secured by bending the bail as at 15.

In prior arrangements of this sort the frictional contact has been entirely produced by a horizontal portion such as at 10 and 12. This has been insufficient to hold the shaft in position and I have found the combined sidewise and radial tension has remedied the defects. Also in prior arrangements similar to these the key has been free to pass over the end from top to bottom in the position shown in Fig. 1 and it will not stay in position for proper insertion of the knob. By providing the notches 4 and 5 and by giving sufficient compression of the bail at the mid portion the bail will snap into these notches and stay in that position when the end of the shaft is being inserted through the panel, in fact it will stay in position until it is intentionally snapped out for some reason or other. Control knob adjustments made in accordance with this invention have been quite successful in operation and the cost has been quite low. Devices fastened together in this way continue to hold in a satisfactory manner without loss of gripping action irrespective of the number of times that they may be attached or detached.

A further advantage in arrangements of this sort is that a knob may be removed from the shaft without there being any liability of the key dropping out of position as is the case with ordinary key and spline arrangements.

Having described my invention, what I claim is:

1. A control shaft member having transverse openings, a spring bail member having its ends secured in said openings, and a control knob having grooves therein adapted to fit over the end of said shaft and bail one of said members having means to cause the bail to be held in frictional contact with the bottom and side of each of said grooves.

2. A control shaft having diametrically positioned transverse openings, and notches in the periphery of its end separated from each other by arcs of unequal length, a spring bail having its ends secured in said openings and a middle portion fitting into each of said notches to hold the bail at a slight angle to the axis of the shaft, and a control member having grooves therein adapted to fit over the said bail when the said member is in position on the end of the shaft whereby said bail tends to expand diametrically of the shaft against the bottom of the said groove and also to press against the sides of the groove tangentially of the shaft.

3. A control shaft having transverse openings, and notches in the periphery of its end, a spring bail having its end secured in said openings and middle portions fitting into each of said notches, a control member having grooves therein and adapted to fit over the end of the shaft, the center of said grooves being positioned slightly out of alignment with the center of said bail whereby the bail tends to press outwardly against the bottom of the grooves and against the sides of the grooves tangentially of the shaft.

In testimony whereof, I have signed my name to this specification this 22nd day of October, 1929.

THEODORE J. SCOFIELD.